(12) United States Patent
Asaro et al.

(10) Patent No.: US 10,545,800 B2
(45) Date of Patent: Jan. 28, 2020

(54) DIRECT DOORBELL RING IN VIRTUALIZED PROCESSING DEVICE

(71) Applicant: ATI Technologies ULC, Markham (CA)

(72) Inventors: Anthony Asaro, Markham (CA); Gongxian Jeffrey Cheng, Markham (CA)

(73) Assignee: ATI Technologies ULC, Markham, Ontario (CA)

(*) Notice: Subject to any disclaimer, the term of this patent is extended or adjusted under 35 U.S.C. 154(b) by 254 days.

(21) Appl. No.: 15/610,047

(22) Filed: May 31, 2017

(65) Prior Publication Data

US 2018/0349165 A1 Dec. 6, 2018

(51) Int. Cl.
| | |
|---|---|
| G06F 9/52 | (2006.01) |
| G06F 9/54 | (2006.01) |
| G06F 9/50 | (2006.01) |
| G06F 9/46 | (2006.01) |
| G06F 9/455 | (2018.01) |
| G06F 9/48 | (2006.01) |

(52) U.S. Cl.
CPC .......... *G06F 9/526* (2013.01); *G06F 9/45533* (2013.01); *G06F 9/466* (2013.01); *G06F 9/4881* (2013.01); *G06F 9/5077* (2013.01); *G06F 9/544* (2013.01)

(58) Field of Classification Search
CPC .... G06F 9/45533; G06F 9/466; G06F 9/4881; G06F 9/526; G06F 9/5077; G06F 9/544
USPC ............................................ 718/1, 101, 102
See application file for complete search history.

(56) References Cited

U.S. PATENT DOCUMENTS

| | | | | |
|---|---|---|---|---|
| 6,598,144 | B1* | 7/2003 | Bailey | G06F 12/145 |
| | | | | 711/202 |
| 7,389,399 | B2* | 6/2008 | Terrell | H04L 63/083 |
| | | | | 711/203 |
| 7,620,057 | B1* | 11/2009 | Aloni | G06F 12/0804 |
| | | | | 370/395.7 |
| 7,784,060 | B2* | 8/2010 | Baumberger | G06F 9/546 |
| | | | | 718/1 |
| 7,826,470 | B1* | 11/2010 | Aloni | H04L 49/9063 |
| | | | | 370/419 |
| 8,478,907 | B1* | 7/2013 | Aloni | G06F 13/128 |
| | | | | 709/250 |
| 2006/0242332 | A1* | 10/2006 | Johnsen | G06F 13/28 |
| | | | | 710/22 |
| 2006/0242354 | A1* | 10/2006 | Johnsen | G06F 13/404 |
| | | | | 710/316 |

(Continued)

*Primary Examiner* — Phillip H Nguyen
(74) *Attorney, Agent, or Firm* — Volpe and Koenig, P.C.

(57) ABSTRACT

A technique for facilitating direct doorbell rings in a virtualized system is provided. A first device is configured to "ring" a "doorbell" of a second device, where both the first and second devices are not a host processor such as a central processing unit and are coupled to an interconnect fabric such as peripheral component interconnect express ("PCIe"). The first device is configured to ring the doorbell of the second device by writing to a doorbell address in a guest physical address space. For security reasons, a check block checks an offset portion of the doorbell address against a set of allowed doorbell addresses for doorbells specified in the guest physical address space, allowing the doorbell to be written if the doorbell is included in the set of allowed doorbell addresses.

20 Claims, 6 Drawing Sheets

(56) References Cited

U.S. PATENT DOCUMENTS

| | | | |
|---|---|---|---|
| 2011/0131581 A1* | 6/2011 | Auernhammer | G06F 9/5077 718/102 |
| 2016/0224474 A1* | 8/2016 | Harriman | G06F 12/1009 |
| 2016/0306645 A1* | 10/2016 | Serebrin | G06F 9/45558 |
| 2016/0306658 A1* | 10/2016 | Serebrin | G06F 3/0619 |

* cited by examiner

DIRECT DOORBELL RING IN VIRTUALIZED PROCESSING DEVICE

BACKGROUND

Computer virtualization is a technique in which a single set of hardware is shared among different virtual instances of a computer system. Each instance—a virtual machine ("VM")—believes that it owns a whole, hardware computer system, but in reality, the hardware resources of a computer system are shared among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for facilitating direct doorbell rings in a virtualized system is provided. A first device is configured to "ring" a "doorbell" of a second device, where both the first and second devices are not a host processor such as a central processing unit and are coupled to an interconnect fabric such as peripheral component interconnect express ("PCIe"). The first device is configured to ring the doorbell of the second device by writing to a doorbell address in a guest physical address space. For security reasons, a check block checks an offset portion of the doorbell address against a set of allowed doorbell addresses for doorbells specified in the guest physical address space, allowing the doorbell to be written if the doorbell is included in the set of allowed doorbell addresses.

Figure 1:
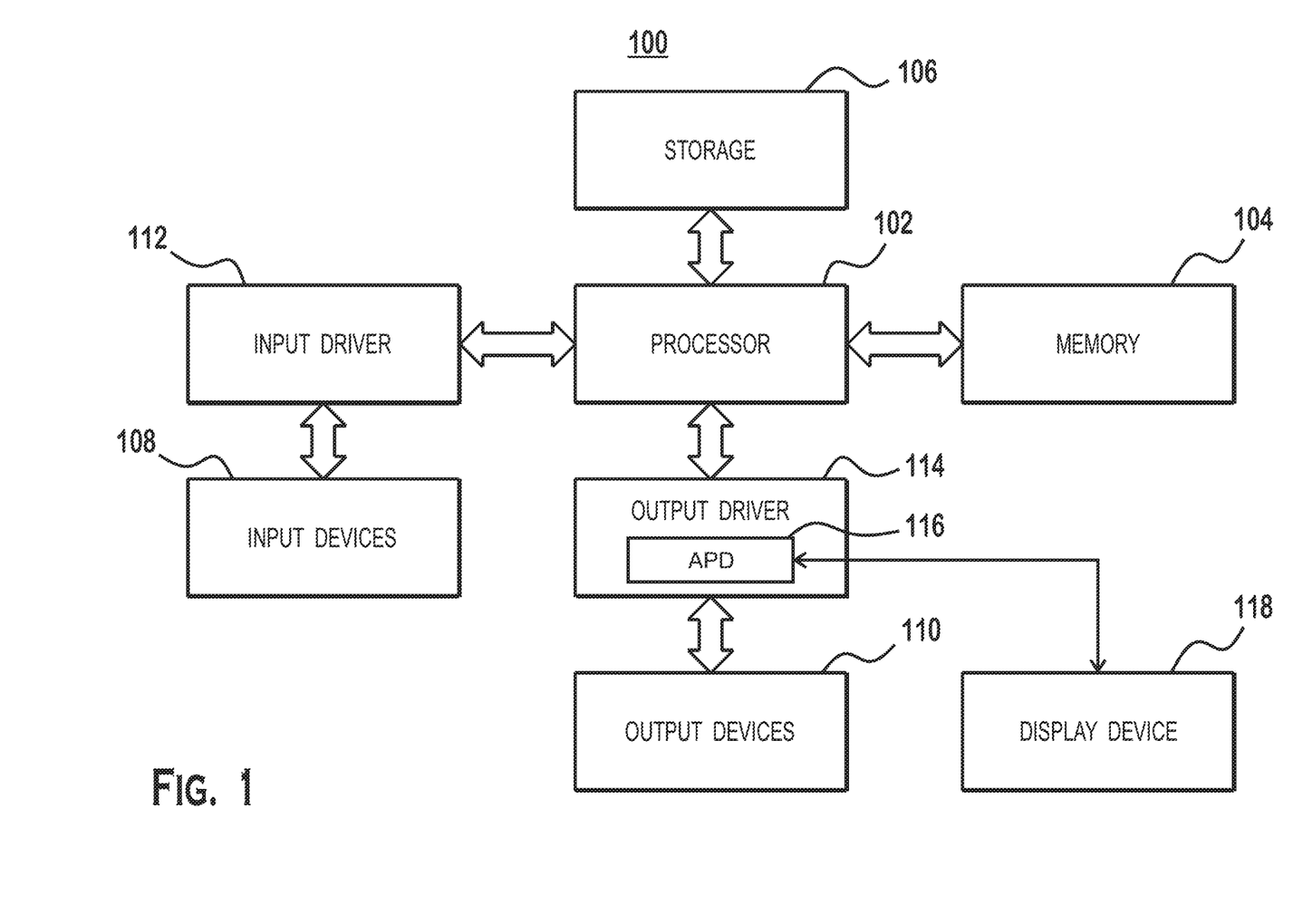
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102 (which may also be referred to as a "host processor"), a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116.

Figure 2:
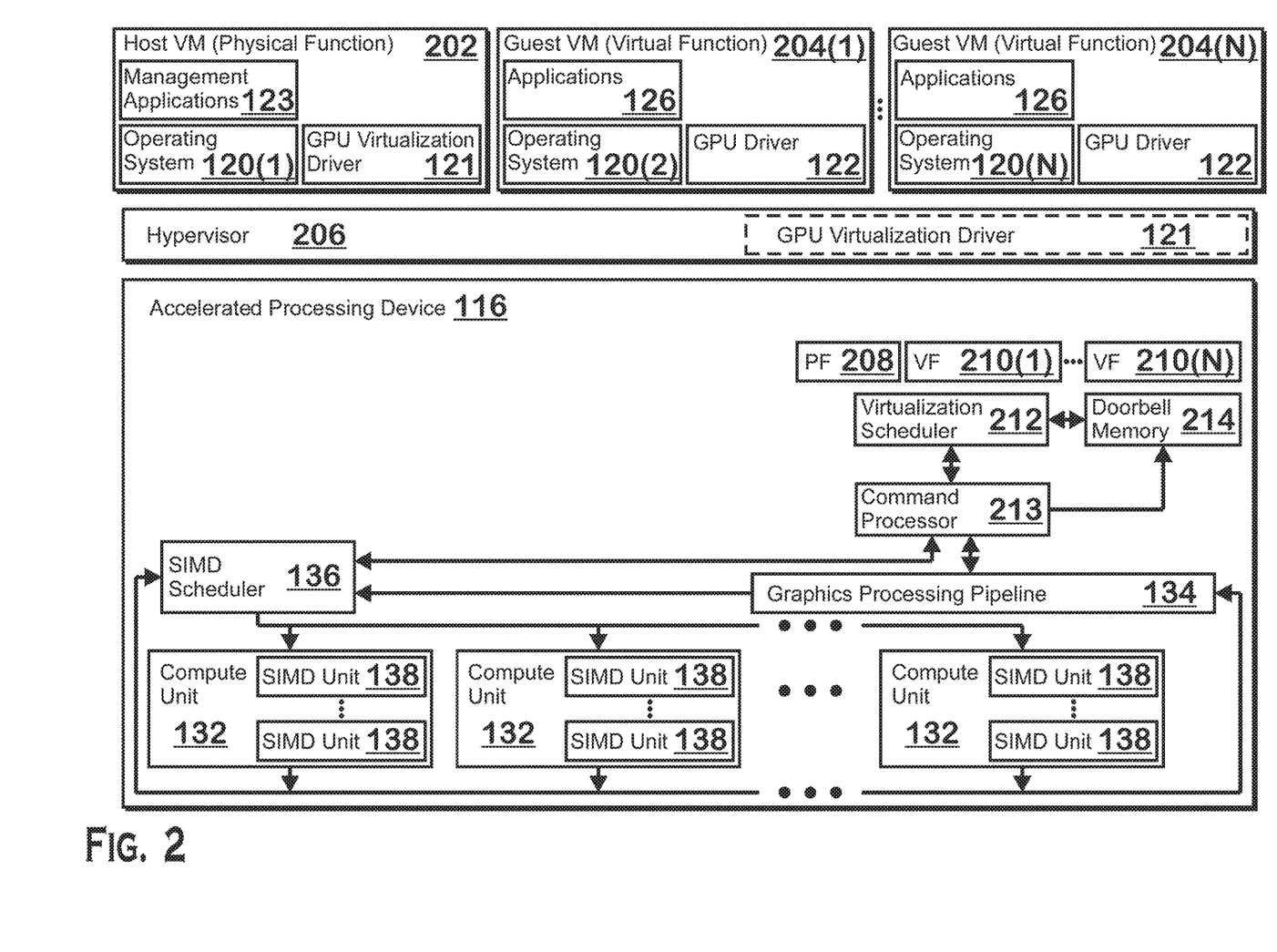
FIG. 2 illustrates details of the device and the accelerated processing device related to virtualization, according to an example.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based sharing of the APD 116 between the virtual machines. On the APD 116, the host VM 202 is mapped to a physical function 208 and guest VMs 204 are mapped to virtual functions 210. "Physical functions" are essentially an addressing parameter in the peripheral component interconnect express ("PCIe") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also acts as an addressing parameter in the PCIe standard. Typically, a set of virtual functions is associated with a particular physical function. Each virtual machine is assigned a different virtual function, with the hypervisor 206 managing the correlation between VMs 202 and virtual functions. This correlation between virtual functions and virtual machines 202 is mostly true in the system of FIG. 2, except that the host VM 202 is able to access the physical function 208 as well as any of the different virtual functions 210. In that sense, the host VM 202 acts as a sort of "master virtual machine" for APD virtualization. In some systems, the host VM 202 is not present, with the functions of the host VM 202 described herein performed by the hypervisor 206 instead (which is why the GPU virtualization driver 121 is illustrated in dotted lines in the hypervisor 206).

As described above, physical functions and virtual functions are addressing parameters in PCIe, where transactions made across PCIe specify or are intended for a particular virtual function and/or physical function and the processor 102 or APD 116 responds accordingly (note, some ways of addressing over PCIe do not explicitly specify a virtual function or physical function; for example, transactions over PCIe can be routed by memory address instead of explicitly by function, where the devices implicitly understand which function is associated with a particular memory address). The processor 102 directs transactions for a particular VM to the appropriate virtual function of the APD 116 via a translation layer managed, for example, by the hypervisor 206. More specifically, the hypervisor, or other translation entity, detects the identity of a virtual machine that requests a particular transaction be made over PCIe to the APD 116, and translates that transaction to include the virtual function number associated with that virtual machine. The host VM 202 does not need such translation because the host VM 202 can specify any virtual function or the physical function. Alternatively, transactions over PCIe may be made by memory address, with the PCIe fabric routing the transaction to an appropriate device and physical function and/or virtual function, based on a memory address. In this scenario, a VM would make an access to a memory address the VM believes is mapped to the APD 116 and the hypervisor or translation layer would translate the provided memory address, which is in guest physical memory address space to an address in the system physical memory address space that is mapped to the APD 116. This translated address does not explicitly include an indication of a virtual function but is mapped to a particular virtual function and is routed to that virtual function by the routing functionality of the PCIe fabric.

Sharing the APD 116 among the different virtual machines is accomplished by time-dividing the operations of the APD 116 amongst the different virtual machines. A virtualization scheduler 212 performs this task, scheduling a new virtual machine for operation by switching from work for a current virtual machine as the execution time assigned to that virtual machine elapses. Although the APD 116 is shared among the different virtual machines, each virtual machine perceives that it has an individual instance of a real, hardware APD 116. Although the terms "virtual function" and "physical function" refer to addressing parameters of the PCIe standard, because these functions map to different VMs, the logical instance of an APD 116 assigned to a particular virtual machine will also be referred to herein as either a virtual function or a physical function. In other words, this disclosure may use terminology such as "the virtual function performs a task," (or physical function) or "an operation is performed on of for a virtual function," (or physical function) and this terminology should be read to mean that the APD 116 performs that task for the time slice assigned to the VM associated with that particular virtual or physical function, or on behalf of the VM associated with that virtual or physical function.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 123 and a GPU virtualization driver 121. The GPU virtualization driver 121 is not a traditional graphics driver that simply communicates with and sends graphics rendering (or other) commands to the APD 116, without understanding aspects of virtualization of the APD 116. Instead, the GPU virtualization driver 121 communicates with the APD 116 to configure various aspects of the APD 116 for virtualization. In one example, the GPU virtualization driver 121 manages parameters related to the time-slicing mechanism for sharing the APD 116 among the different VMs, controlling parameters such as how much time is in each time slice, how switching is performed between different virtual functions, and other aspects. Note, the GPU virtualization driver 121 may also issue traditional graphics rendering commands to the APD 116 or may issue other commands not directly related to configuration of the APD 116. The management applications 123 perform one or more tasks for managing virtualization and/or that involve data from two or more different guest VMs 204. In one example, the host VM 202 performs a desktop compositing function through a management application 123, where the desktop compositing function has access to rendered frames from the different guest VMs 204 and composites those frames into a single output view.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or slightly modified version of a device driver for a GPU that would exist in a bare-bones non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. The driver 122 also includes a just-in-time compiler that compiles programs for execution by processing components (such as the SIMD units 138 discussed in further detail below) of the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism, using the doorbell memory 214.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The virtualization scheduler 212 manages time-sharing of the APD 116 among the different virtual machines. In each time slice, the virtualization scheduler 212 permits work for the virtual machine associated with that time slice to proceed in the APD 116. The doorbell memory 214 stores doorbells, which are indications that work is ready to be performed on the APD 116 for a particular virtual machine. The doorbell mechanism operates asynchronously with respect to which virtual machine is currently scheduled for work on the APD 116. This means that a particular virtual machine may place a doorbell in doorbell memory 214 at a time when tasks for a VM other than the VM that placed the doorbell in the doorbell memory 214 are being executed on the APD 116.

Virtualization on the APD 116 works as follows. The virtualization scheduler 212 manages time slices on the APD 116 for the VMs (both the host VM 202 and the guest VMS 204) that share the APD 116. The virtualization scheduler 212 tracks the time slices, stopping work on the APD 116 when a time slice for a particular VM has expired and starting work for the VM having the next time slice. Thus, the virtualization scheduler 212 switches between different VMs that have work to be executed on the APD 116.

Figure 3:
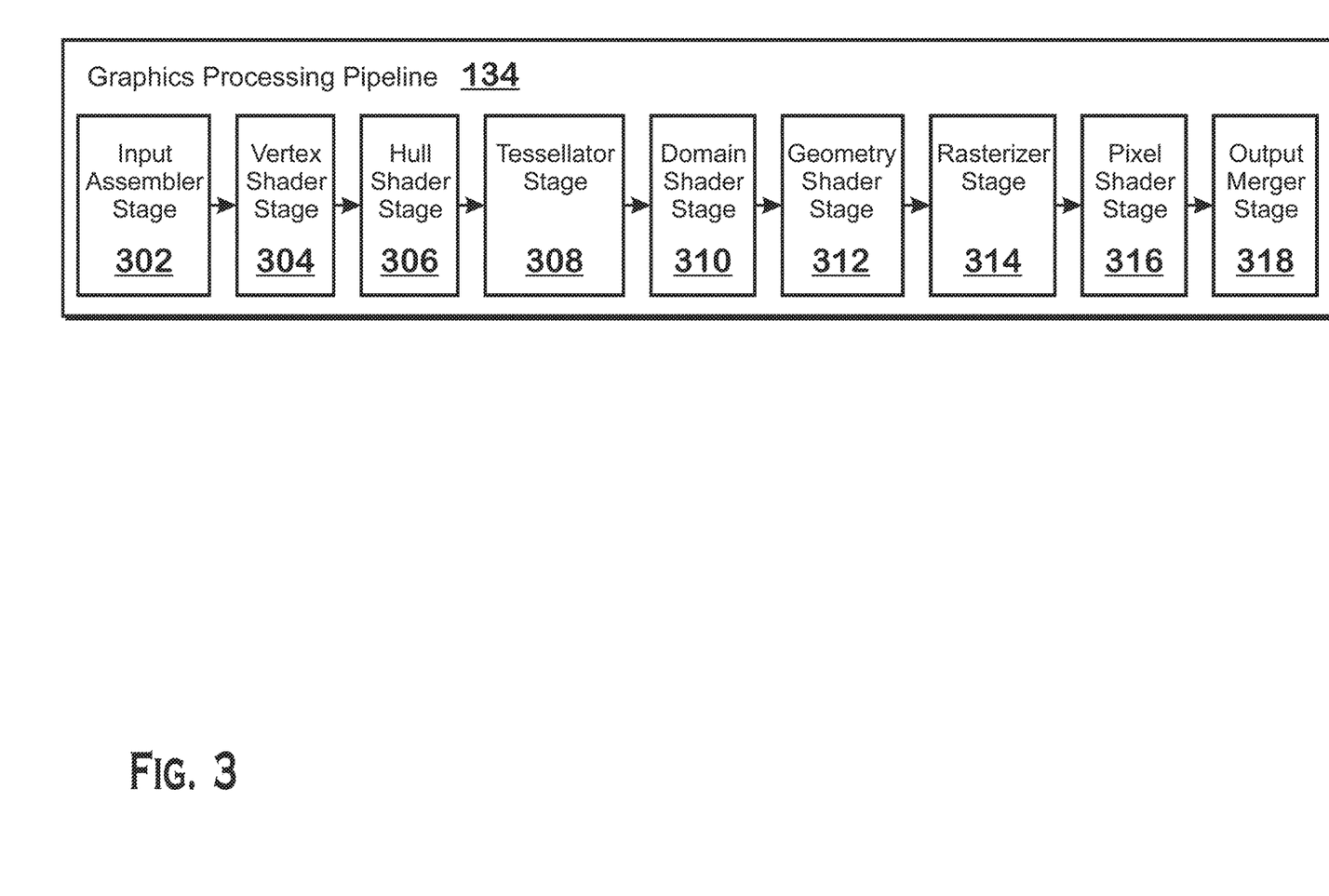
FIG. 3 is a block diagram showing additional details of the graphics processing pipeline illustrated in FIG. 2.

To begin work for a particular time slice associated with a particular VM, the virtualization scheduler 212 causes the command processor 213 to fetch commands for the graphics processing pipeline 134 and/or for general purpose computing work from the address specified by the doorbell memory 214 for the particular VM. The command processor 213 then causes the APD 116 to execute those commands. Note that the other portions of the APD 116 whose functionality is not specifically described in the context of virtualization works as described above and as if no virtualization was occurring to execute the commands fetched by the command processor 213. For example, the graphics processing pipeline 134 performs operations related to graphics rendering in response to graphics rendering commands fetched by the command processor 213. For at least some of the graphics rendering commands associated with the graphics processing pipeline 134, and/or for the general purpose compute operation, SIMD scheduler 136 generates and manages wavefronts for execution on the SIMD units 138 of the compute units 132 in accordance with the commands processed by the command processor 213. In an example a command is a command to render a particular piece of geometry using, among other facilities of the graphics processing pipeline 134, a particular pixel shader program. The graphics processing pipeline 134 processes the geometry through the various stages of the graphics processing pipeline 134, such as the input assembler stage 302, hull shader stage 306, tessellator stage 308, and so on, and at the pixel shader stage 316, causes the geometry to be processed with a specific pixel shader, on the SIMD units 138. The SIMD scheduler 136, manages and schedules the wavefronts for the pixel shader for execution.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Referring back to FIG. 2, when the virtualization scheduler 212 determines that the time slice for the VM having work currently executing on the APD 116 has expired, the virtualization schedulers causes the APD 116 to complete that work without accepting any new work (e.g., does not accept new tasks pointed to by a doorbell stored in the doorbell memory 214 but completes the tasks already "in flight" in the graphics processing pipeline 134 and/or compute units 138). Completing the tasks involves allowing the work currently in-flight in the APD 116 to complete and to have final output values written out to the target memory location. For example, for graphics rendering, output pixels would be written to the frame buffer (or other render target). (Note, stalls may occur in which work currently executing in the APD 116 either does not complete or takes an exceedingly long time to complete). The virtualization scheduler 212, GPU virtualization driver 121, management applications 123 in the host VM 202, and/or another entity may work independently or cooperate to handle stalls.

After work has completed for a particular VM, the virtualization scheduler 212 moves on to the time slice for the next VM, causing the command processor 213 to fetch tasks for that VM based on the contents of the doorbell memory 214, and to execute those tasks on the graphics processing pipeline 134 and/or in the compute units 132 directly (e.g., for general purpose computing). This process of stopping execution of work for a time slice that has expired and starting work for the next VM continues to provide time-sharing of the APD 116 to the different VMs.

The change between execution of work for one VM and execution of work for another VM is referred to as a "world switch" herein. In addition to stopping work for one VM and starting work for another VM, a world switch also involves saving state for the VM that is being switched away from and loading state for the VM that is being switched to. Generally, state includes values stored throughout or for the APD 116 that manage aspects of the workflow executed for the APD 116. In various examples, state may include values stored in registers that control how graphics is rendered, how SIMD work is executed, how shaders are executed, and control various other aspects of operations on the APD 116. Saving state involves writing the state from an in-use location (where the state values actually have effect on the operation of the APD 116) to a save state location for the VM. Loading state involves loading the state from the save state location for the VM to the in-use location.

A system physical address space is the "true" physical address space of the device. The hypervisor 206 is able to access this address space, but this address space is hidden from VMs. A guest physical address space is the virtualized "physical" address space as "seen" by a particular guest VM 204. In other words, to a guest VM 204, a guest physical address space appears to be the actual physical address space. A third address space—guest virtual memory—represents the typical virtual memory address space that would exist in computer systems, but that exists in the virtualized environment of a VM. Mappings between the system physical address space and the guest physical address space are managed by the hypervisor 206 and mappings between the guest virtual address space and the guest physical address space are managed by the operating systems 120 although other parts of the device 100 (such as hardware-based page table walkers, translation caches, or other elements) may be involved in managing mappings between the different address spaces.

As described above, a doorbell mechanism is used as a technique for informing the APD 116 that work is ready to be performed. The doorbell mechanism may be used to inform engines other than the APD 116, such as various multimedia engines (e.g., video encoding engines), that work is ready for that engine to perform. For the sake of clarity, the doorbell mechanism will be described with respect to FIG. 2 in the context of the APD 116. However, it should be understood that the description of the doorbell mechanism applies to engines other than the APD 116.

The doorbell mechanism operates in two different modes: a CPU-directed mode (which may also be referred to as a "system-physical-addressed-mode" or an "SPA-mode"); and a direct doorbell ring mode, (which may also be referred to as a "guest-physical-address-mode" or a "GPA-mode"). In either mode, the doorbell works as follows. An entity (e.g., processor 102) writes work into a command buffer. Then, the entity writes a doorbell value to a doorbell address. The doorbell address is associated with a particular "doorbell," which is a particular instance of the doorbell mechanism. The doorbell value may be simply a "ready" indicator or may include information that indicates the memory address at which work to be performed is located, within the command buffer.

In an example, the address associated with the command buffer is a head pointer for the command buffer. In such an example, the command buffer may be a ring buffer with a tail pointer that is maintained by the APD 116. When the APD 116 consumes a command from the command buffer, the APD 116 advances the tail pointer, but does not go past the head pointer for the command buffer. The tail pointer wraps around when the tail pointer reaches the highest address of the circular buffer. The APD 116 may inform the processor 102 of the address of the tail pointer so that the processor 102 knows how much space remains in the command buffer.

For the CPU-directed mode, the processor 102 writes a doorbell value to a system physical address which indicates to an engine, such as the APD 116, that work is ready to be performed. In essence, the processor 102 accesses the doorbell via the system physical address in the CPU-directed mode. In greater detail, in the CPU-directed mode, an entity executing on the processor 102, such as a guest virtual machine 204, first writes commands into a command buffer and then notifies the APD 116 that work exists to be performed by the APD 116 by writing a doorbell to a memory address associated with a doorbell for that APD 116. The doorbell specifies a memory address associated with the command buffer. Note that although described as "CPU-directed," it is possible for the APD 116 or other device different from the processor 102 to ring a doorbell in the CPU-directed mode, if that APD 116 or other device is able to obtain a translation from a guest virtual or physical address to a system physical address. Without the ability to obtain such a translation, the direct doorbell ring mode is used.

In ringing the doorbell in the CPU-directed mode, even though an entity such as a guest VM, which is only aware of guest physical addresses and guest virtual addresses, rings the doorbell, the address provided by the guest VM is eventually translated (e.g., through page tables, translation lookaside buffers ("TLBs"), and/or other mechanisms) to a system physical address, which is then used to write the appropriate doorbell to the APD 116. In other words, the address to which the doorbell value is written is specified initially by the VM in the guest physical address space but is eventually translated to the system physical address space. The doorbell value is then written to that address in the system physical address space, in order to ring the doorbell.

In a second mode, a "direct doorbell ring" mode, the doorbell of an engine is rung not by an entity executing on the processor 102, but instead by another engine that does not have access to the translation mechanisms used by the processor 102 (e.g., the page tables, TLB's or the like). Such engines may be, for example, PCIe devices. Moreover, both the engine that rings the doorbell and the engine whose doorbell is rung are operating in a virtualized environment. For example, if the APD 116 is the entity that rings the doorbell, then the APD 116 is operating in a manner in which different time slices are shared among different PCIe functions (as is the engine whose doorbell is rung). For this reason, operations performed by the APD 116 on behalf of a virtual function specify the address of the doorbell to be rung not in the system physical address space but instead in the guest physical address.

The reason the address of the doorbell is specified as a guest virtual address is due to the manner in which the address is originally specified (e.g., the manner in which the APD 116 is initialized with a doorbell address of the other engine). More specifically, the VM that sets up the APD 116 to ring the doorbell of the other engine specifies that doorbell in guest physical address because the VM does not have access to system physical addresses and thus cannot specify the doorbell to be rung by system physical address. Moreover, the standard translation mechanism that is normally used to translate addresses from guest physical address to system physical address is not available to translate the guest physical addresses that are provided to the APD 116 as part of the initialization process.

More specifically, to utilize the direct doorbell ring mode, a VM provides a configuration command to the APD 116 indicating the address of the doorbell to be rung. However, this address cannot be provided in the system physical address space. More specifically, the standard translation mechanism is available to translate addresses specified as the memory location that is the target of a memory access. For example, for a read or write to an address, the address translation mechanism will translate the address to be read from or written to into a system physical address. However, the translation mechanism does not translate values that are the subject of memory accesses. For example, in a command to write a particular value, the value that is to be written, if an address, cannot be translated—only the address to which the value is written is translated.

The manner in which the APD 116 is instructed as to how to ring a particular doorbell is that a VM transmits the address of the doorbell to the APD 116 in a configuration operation. As described above, because this address is the subject of a transaction, rather than the address that is the target of a transaction, this address is not translated. Thus, because the address that is the subject of the configuration operation is untranslated, the address is a guest physical address and thus the address that the APD 116 uses to ring that doorbell is a guest physical address, and when the APD 116 rings these doorbells, the APD 116 writes a doorbell value to the doorbell using the guest physical address.

The direct doorbell ring mode (the second mode discussed for ringing doorbells) provides the benefit of allowing a first non-CPU device to notify a second non-CPU device that work is ready to be performed by the second non-CPU device in a virtualized environment. More specifically, by allowing doorbells to be rung by guest physical address, one device is able to ring the doorbell of another device. However, allowing guest physical addresses to be used in this manner presents a security issue. More specifically, as described above, a doorbell is "rung" but writing to a specific memory address. The doorbell mechanism works by first matching the memory address to a range of addresses specified by a doorbell base address register, to determine that the memory address actually specifies a doorbell. Then, an offset within the memory address is used to specify a particular doorbell. For example, one particular offset might specify the doorbell for the APD 116 and another offset might specify the doorbell for another engine. Moreover, the offset that is derived from the address to be written for the doorbell is mapped to the same doorbell regardless of which VM is making the write to the doorbell or if the write is made in the system physical address space. Thus, one engine could access a doorbell for any engine if a protection mechanism were not provided. For this reason, the direct doorbell ring mode also include a screening mechanism whereby permitted offset values are pre-specified for different virtual functions and if an offset derived from an address specified as a guest physical address does not fall into a permitted range of offsets, then the doorbell write is disallowed.

Figure 4:
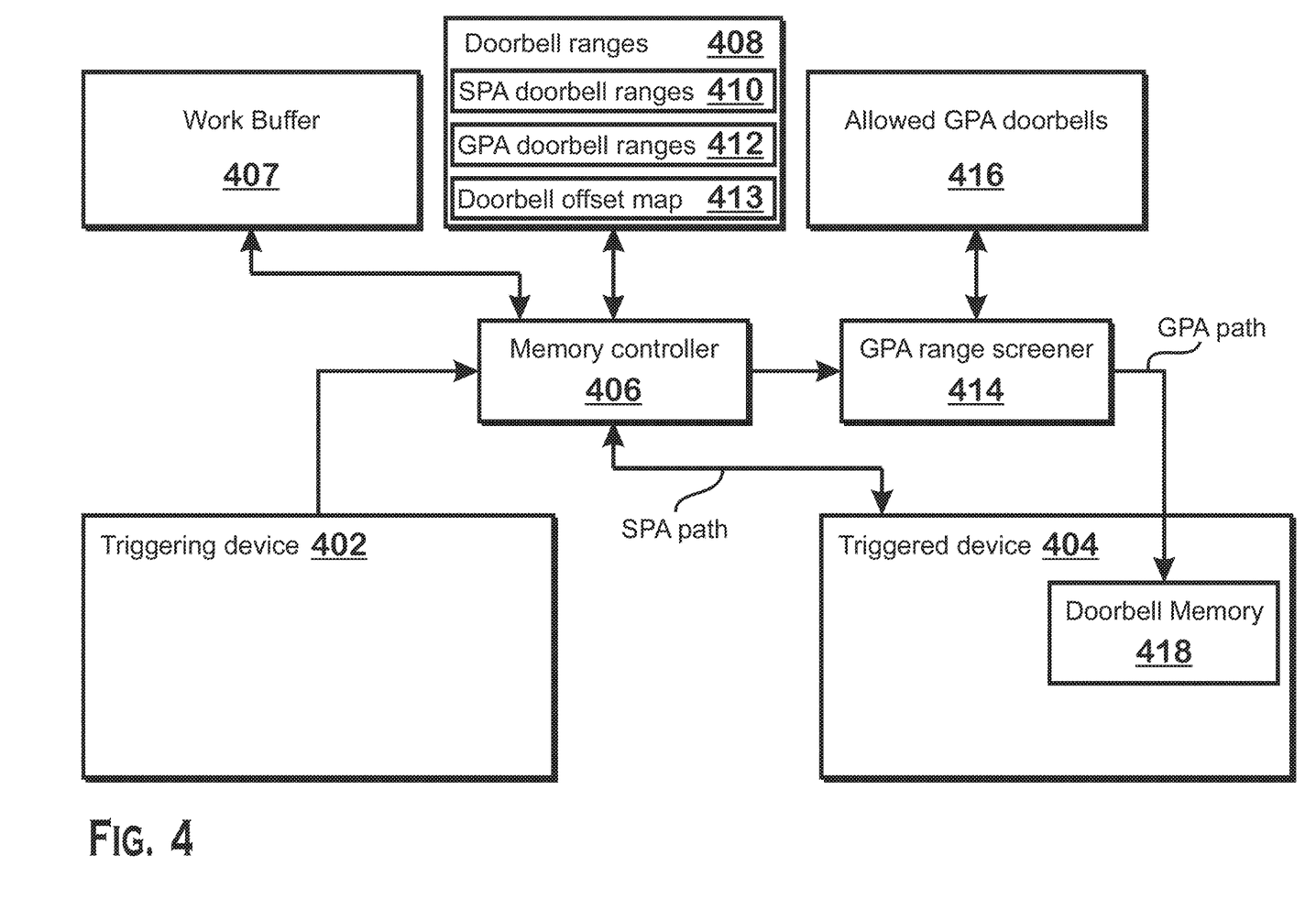
FIGS. 4 and 5 illustrate a technique for facilitating access to doorbells in the direct-access doorbell mode, according to examples.
Figure 5:
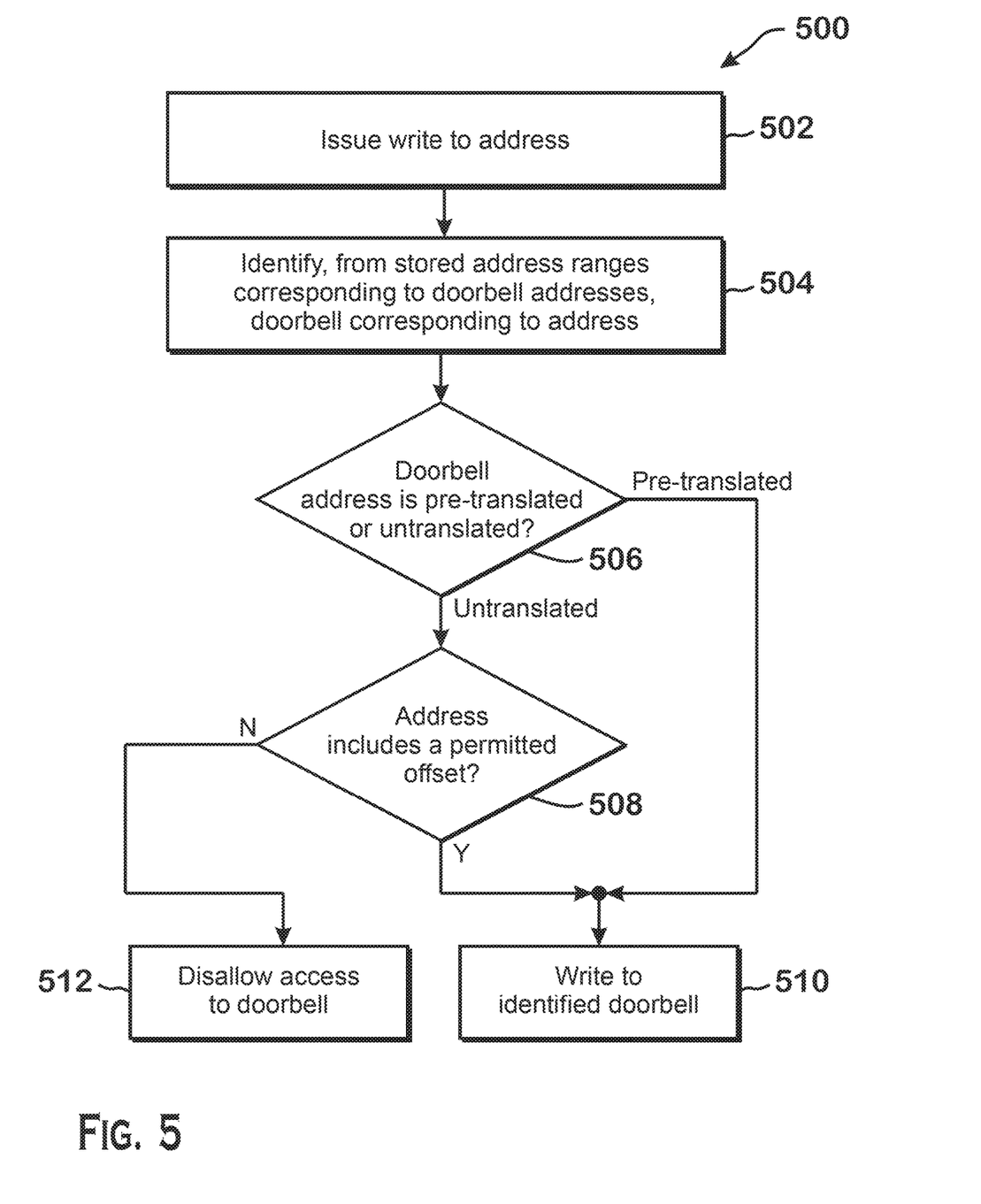

FIGS. 4 and 5 illustrate a technique for facilitating access to doorbells in the direct-access doorbell mode, according to examples. More specifically, FIG. 4 is a block diagram illustrating aspects of the APD 116 related to the direct doorbell ring according to an example and FIG. 5 is a flow diagram of a method 500 for triggering a doorbell in a direct-access mode, according to an example. FIGS. 4 and 5 will now be described together. Although the operations of FIG. 5 are described with respect to the system of FIGS. 1-4, it should be understood the method 500, performed by any system, with steps as illustrated or in any other technically feasible order, falls within the scope of the present disclosure.

A first device—the triggering device 402—writes work items into a work buffer 407. The work items are written via an address (e.g., the triggering device 402 writes work items to an address) via a memory controller 406 which performs function such as routing and address translation. After writing work items to the work buffer 407, the triggering device 402 issues a write to a doorbell address for the triggered device 404, at step 502. The write is provided to a memory controller 406, which compares the address to be written to doorbell ranges 408, including a range of system physical addresses for doorbells 410 and a range of guest physical addresses for doorbells 412. Because the address does fit into one of the ranges, the memory controller 406 determines that the write is a write to a doorbell. Note, the comparison to the doorbell ranges 408 includes, if the address being compared is a system physical address, then the memory controller 406 compares the address to the SPA doorbell ranges 410, and if the address being compared is a guest physical address, then the memory controller 406 compares the address to the GPA doorbell ranges 412. Also, note that if the address did not fit into one of the ranges (SPA doorbell ranges 410 or GPA doorbell ranges 412), then the memory controller 406 would determine that the access is not an access to a doorbell and would thus not proceed with the remainder of the method 500.

Referring back to the situation where the write is a write to a doorbell, the memory controller 406 identifies an offset (a portion of the address which in an example includes some of the least significant bits of the address) from the address and identifies which specific doorbell the address refers to. More specifically, different offsets refer to different doorbells. For example, one offset may refer to a doorbell for work on the APD 116, one offset may be for a doorbell for work on a video encoder, and other offsets may refer to doorbells for work on other devices. The memory controller 406 identifies a particular doorbell based on the offset of the address, from the doorbell offset map 413. Identifying the doorbell based on the offset occurs at step 504.

At step 506, the memory controller 406 determines whether the doorbell address is pre-translated or is untranslated. A pre-translated address is a system physical address that has been pre-translated by some entity such as a memory management unit ("MMU") of the processor 102. An untranslated address has not been translated to a system physical address and in the context of FIG. 4 is a guest physical address. If the address is pre-translated, then the method 500 proceeds to step 510 and if the address is untranslated, then the method 500 proceeds to step 508. At step 508, the GPA range screener 414 checks the offset for the address against allowed GPA doorbells 416. The allowed GPA doorbells 416 comprise a stored range or list of offsets that are allowed to be accessed by GPA addresses. If the GPA range screener 414 determines that the offset is a permitted offset, then the method 500 proceeds to step 510 and if the GPA range screener 414 determines that the offset is not a permitted offset, then the method 500 proceeds to step 512, where the GPA range screener 414 disallows the write to the doorbell. The operations associated with the "untranslated" branch from step 506 are shown as the "GPA path" in FIG. 4 and the operations associated with the "translated" branch from step 506 are shown as the "SPA path" in FIG. 4. Referring back to step 506, if the doorbell address is pre-translated, then the method 500 proceeds to step 510 where the doorbell is written to the address specified, i.e., into the doorbell memory 418.

Figure 6:
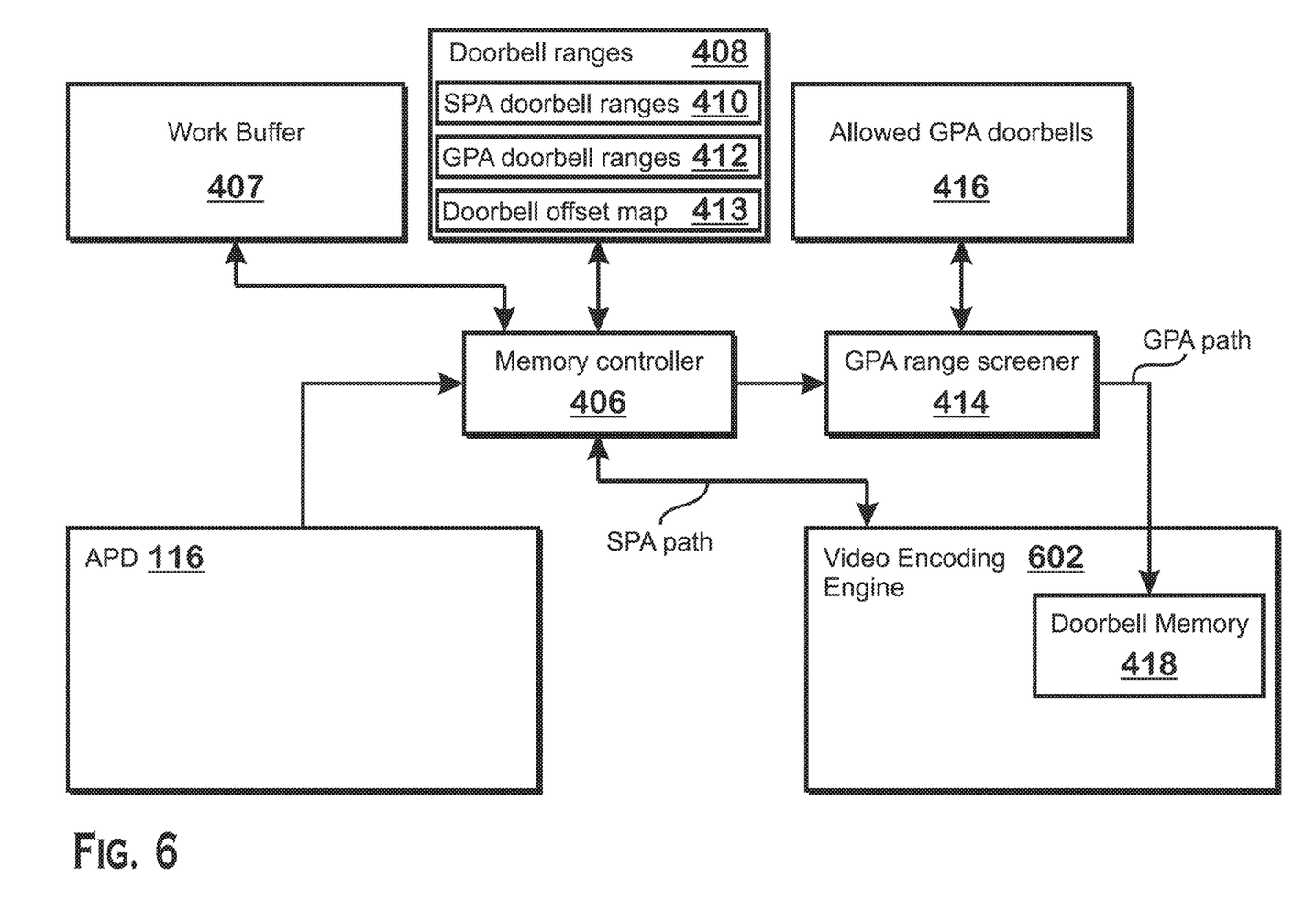
FIG. 6 provides a specific example configuration for the system of FIG. 4, according to an example.

FIG. 6 provides a specific example configuration for the system 400 of FIG. 4. More specifically, in FIG. 6, the APD 116 of FIG. 2 writes to a doorbell for a video encoding engine 602. One situation in which this may occur is where the APD 116 is being used to render graphics frames for transmission across a network. More specifically, the APD 116 renders frames based on 3D model data (or based on other data), producing a finished frame including a series of pixels. Because such frames are typically quite large in terms of amount of data, a video encoding engine 602 is provided to encode or compress the data. Any technically feasible encoding scheme could be used. One example of such an encoding scheme includes H.264 encoding. The video encoding engine 602 may include any combination of software and hardware configured to implement that encoding. The video encoding engine 602 is notified that work is ready for to be consumed via the doorbell mechanism—specifically, an actor such as the APD 116 or the processor 102 writes work to a work buffer such as work buffer 407 and then writes a doorbell value to an address associated with a doorbell for the video encoding engine 602. Responsive to the doorbell, the video encoding engine 602 encodes the frame.

The direct-doorbell mechanism avoids the latency associated with notifying the processor 102 which would then notify the video encoding engine 602 when a new frame is ready to be processed. Instead of this process, the APD 116 directly notifies the video encoding engine 602 that a frame is ready to process. The technique involves allowing doorbell writes to occur via guest physical addresses, rather than just by system physical addresses, but also checking provided guest physical addresses against the set of allowed guest physical address doorbells 412. The purpose of this check is to prevent an arbitrary device from accessing an arbitrary doorbell. More specifically, access to doorbells via guest physical address is for limited purposes, and not for plenary use.

It should be understood that many variations are possible based on the disclosure herein. For example, although PCIe has been described herein as a particular interconnect fabric, any other technically feasible interconnect fabric may be alternatively used. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for sending a notification, by a first processing engine, to a second processing engine, that work is ready to be performed in a virtualized environment, the method comprising:
   issuing a first write request of a first doorbell value to a first address specified in a guest physical address space;
   comparing the first address to one or more doorbell base addresses to determine that the first address refers to a first doorbell of the second processing engine;
   determining that a first offset of the first address matches in a set of allowed offsets for doorbells specified by guest physical addresses; and
   responsive to the determining, causing the first write request to occur, resulting in the first doorbell value being written to a doorbell memory for the second processing engine, wherein the doorbell memory is identified by the first address specified in the guest physical address space, without translation into a system physical address space.

2. The method of claim 1, further comprising:
   issuing a second write request of a second doorbell value to a second address specified in the system physical address space;
   comparing the second address to the one or more doorbell base addresses to determine that the second address refers to a second doorbell; and
   causing the second write request to occur to the second doorbell, without checking a second offset of the second address against the set of allowed doorbells, due to the second address being in the system physical address space.

3. The method of claim 2, wherein:
   the second write request is issued via a host processor.

4. The method of claim 1, further comprising:
   issuing a second write request of a second doorbell value to a second address specified in a guest physical address space;
   comparing the second address to the one or more doorbell base addresses to determine that the second address refers to a second doorbell;
   determining that a second offset of the second address does not match in a set of allowed offsets for doorbells specified by guest physical addresses; and
   responsive to the determining, preventing the second write request from occurring, resulting in the first doorbell value being written to a doorbell memory for the second processing engine.

5. The method of claim 1, wherein:
   issuing the first write request is performed by a first virtualized engine configured to share functionality among a plurality of virtualization guests; and
   the second processing comprises a second virtualized engine that is configured to share functionality among a plurality of virtualization guests.

6. The method of claim 5, wherein:
the first virtualized engine includes a graphics processing pipeline configured to render frames based on graphics commands and to generate doorbell write requests in response to frames being rendered, the doorbell write requests including the first write request; and
the second virtualized engine includes a video encoding engine configured to encode rendered frames from the first virtualized engine responsive to detecting the doorbell write requests from the first virtualized engine.

7. The method of claim 1, further comprising:
writing a first work item into a work buffer,
wherein the first doorbell value includes an address associated with the work buffer.

8. The method of claim 7, further comprising:
consuming the first work item from the work buffer, by the second processing engine, responsive to the first doorbell value being written to the doorbell memory for the second processing engine.

9. The method of claim 1, wherein:
the first doorbell value is written to the doorbell memory for the second processing engine without intervention by a host processor.

10. A system for sending notifications that work is ready to be performed in a virtualization environment, the system comprising:
a first processing engine configured to issue a first write request of a first doorbell value to a first address specified in a guest physical address space;
a second processing engine;
a memory controller configured to compare the first address to one or more doorbell base addresses to determine that the first address refers to a first doorbell of the second processing engine; and
a guest physical address ("GPA") range screener configured to determine that a first offset of the first address matches in a set of allowed offsets for doorbells specified by guest physical addresses and to, responsive to the determining, cause the first write request to occur, resulting in the first doorbell value being written to a doorbell memory for the second processing engine, wherein the doorbell memory is identified by the first address specified in the guest physical address space, without translation into a system physical address space.

11. The system of claim 10, wherein:
the first processing engine or another processing engine of the system is configured to issue a second write request of a second doorbell value to a second address specified in the system physical address space;
the memory controller is further configured to compare the second address to the one or more doorbell base addresses to determine that the second address refers to a second doorbell, and to cause the second write request to occur to the second doorbell, without a second offset of the second address being checked against the set of allowed doorbells, due to the second address being in the system physical address sp ace.

12. The system of claim 11, wherein:
the second write request is issued via a host processor.

13. The system of claim 10, wherein:
the first processing engine or another processing engine of the system is configured to issue a second write request of a second doorbell value to a second address specified in a guest physical address space;

the memory controller is further configured to compare the second address to the one or more doorbell base addresses to determine that the second address refers to a second doorbell;
the GPA range screener is configured to determine that a second offset of the second address does not match in a set of allowed offsets for doorbells specified by guest physical addresses, and, responsive to the determining, prevent the second write request from occurring, resulting in the first doorbell value being written to a doorbell memory for the second processing engine.

14. The system of claim 10, wherein:
issuing the first write request is performed by a first virtualized engine configured to share functionality among a plurality of virtualization guests; and
the second processing comprises a second virtualized engine that is configured to share functionality among a plurality of virtualization guests.

15. The system of claim 14, wherein:
the first virtualized engine includes a graphics processing pipeline configured to render frames based on graphics commands and to generate doorbell write requests in response to frames being rendered, the doorbell write requests including the first write request; and
the second virtualized engine includes a video encoding engine configured to encode rendered frames from the first virtualized engine responsive to detecting the doorbell write requests from the first virtualized engine.

16. The system of claim 10, wherein:
the first processing engine is configured to write a first work item into a work buffer; and
the first doorbell value includes an address associated with the work buffer.

17. The system of claim 16, wherein the second processing engine is further configured to:
consume the first work item from the work buffer, responsive to the first doorbell value being written to the doorbell memory for the second processing engine.

18. The system of claim 10, wherein:
the first doorbell value is written to the doorbell memory for the second processing engine without intervention by a host processor.

19. A computing device, comprising:
a host processor configured to execute an operating system and virtual machines;
a first processing engine configured to issue a first write request of a first doorbell value to a first address specified in a guest physical address space;
a second processing engine;
a memory controller configured to compare the first address to one or more doorbell base addresses to determine that the first address refers to a first doorbell of the second processing engine; and
a guest physical address ("GPA") range screener configured to determine that a first offset of the first address matches in a set of allowed offsets for doorbells specified by guest physical addresses and to, responsive to the determining, cause the first write request to occur, resulting in the first doorbell value being written to a doorbell memory for the second processing engine, wherein the doorbell memory is identified by the first address specified in the guest physical address space, without translation into a system physical address space.

20. The computing device of claim 19, wherein:
the first doorbell value is written to the doorbell memory for the second processing engine without intervention by a host processor.

* * * * *